(12) United States Patent
Bennett

(10) Patent No.: US 7,106,537 B1
(45) Date of Patent: Sep. 12, 2006

(54) DISK DRIVE USING A TIMER TO ARBITRATE PERIODIC SERIAL COMMUNICATION WITH A POWER DRIVER

(75) Inventor: George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 72 days.

(21) Appl. No.: 11/050,537

(22) Filed: Feb. 2, 2005

(51) Int. Cl.
*G11B 15/18* (2006.01)
*G11B 5/596* (2006.01)

(52) U.S. Cl. .................. 360/69; 360/75; 360/77.02
(58) Field of Classification Search .......... 360/69, 360/77.02
See application file for complete search history.

(56) References Cited

U.S. PATENT DOCUMENTS

| | | | |
|---|---|---|---|
| 4,962,378 A | 10/1990 | Fadem | |
| 5,611,075 A | 3/1997 | Garde | |
| 5,726,821 A | 3/1998 | Cloke et al. | |
| 5,784,374 A | 7/1998 | Runaldue | |
| 5,909,558 A | 6/1999 | Linzmeier et al. | |
| 6,014,285 A | 1/2000 | Okamura | |
| 6,061,360 A | 5/2000 | Miller et al. | |
| 6,111,717 A | 8/2000 | Cloke et al. | |
| 6,279,108 B1 * | 8/2001 | Squires et al. | 712/244 |
| 6,490,118 B1 | 12/2002 | Ell et al. | |
| 6,701,388 B1 | 3/2004 | Smith et al. | |
| 6,754,242 B1 | 6/2004 | Briddell et al. | |
| 6,768,607 B1 | 7/2004 | Ottesen et al. | |
| 2002/0097643 A1 | 7/2002 | Kadlec et al. | |
| 2002/0191503 A1 * | 12/2002 | Kataoka et al. | 369/44.29 |

* cited by examiner

*Primary Examiner*—Wayne Young
*Assistant Examiner*—Jason Olson
(74) *Attorney, Agent, or Firm*—Howard H. Sheerin, Esq.

(57) ABSTRACT

A disk drive is disclosed comprising a microprocessor and a power driver for generating at least one actuator signal applied to the VCM actuator, wherein a serial communication circuit is used to communicate with the power driver. At least one control component periodically generates a control signal, wherein the control signal is transmitted at a substantially constant periodic interval using the serial communication circuit, and a timer times the periodic interval. A job queue controller queues and arbitrates serial communication requests to access the power driver using the serial communication circuit. The serial communication requests include a request to transmit the control signal and requests generated by the microprocessor. The job queue controller services a communication request generated by the microprocessor if the communication request can be serviced before the timer expires.

45 Claims, 5 Drawing Sheets

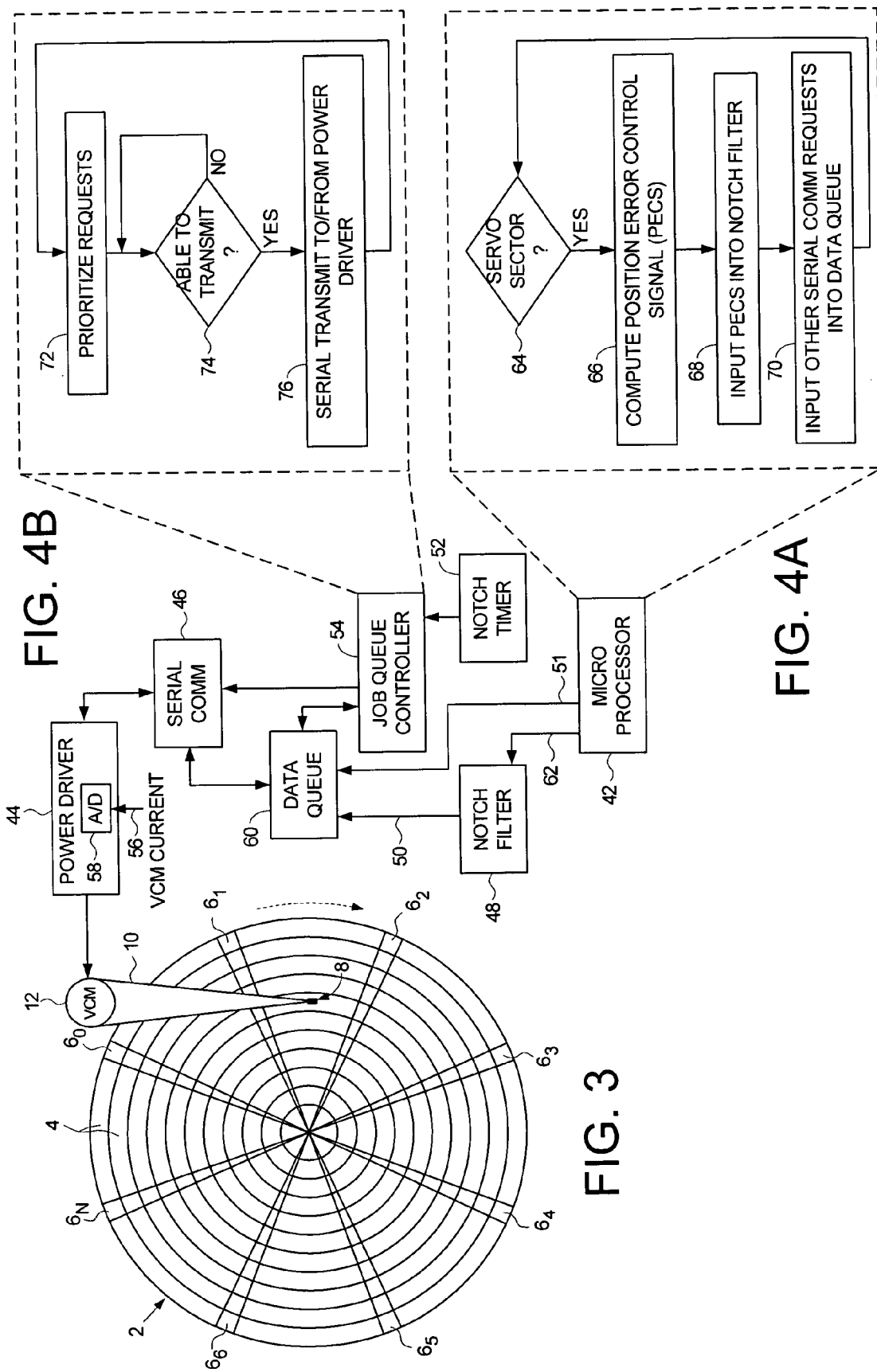

| NOTCH 2 MX | NOTCH 1 NX | | | |
|---|---|---|---|---|
| | 1 | 2 | 3 | 4 |
| 1 | 0 | 0 | 0 | 0,6 |
| 2 | 0 | 0,4 | 0,4 | 0,6 |
| 3 | 0 | 0,6 | 0 | 0,2,4,6 |
| 4 | 0 | 0,6 | 0,2,4,6 | 0,6 |

DISK DRIVE USING A TIMER TO ARBITRATE PERIODIC SERIAL COMMUNICATION WITH A POWER DRIVER

BACKGROUND OF THE INVENTION

1. Field of the Invention

The present invention relates to disk drives. In particular, the present invention relates to a disk drive using a timer to arbitrate periodic serial communication with a power driver.

2. Description of the Prior Art

FIG. 1 shows a prior art disk drive comprising a disk 2 having a plurality of concentric tracks 4 and a plurality of embedded servo sectors $6_0$–$6_N$. The embedded servo sectors $6_0$–$6_N$ comprise positioning information, including a track address and servo bursts, for positioning a head 8 over a target track during write and read operations. The head 8 is connected to a distal end of an actuator arm 10 which is rotated about a pivot by a voice coil motor (VCM) 12 in order to actuate the head 8 radially over the disk 2.

As the head 8 passes over each servo sector $6_i$ the read signal emanating from the head 8 is demodulated by a read channel circuit (not shown). The demodulated servo information is processed by a microprocessor 14 to generate a position error signal (PES) representing a position error between the head's 8 actual position and target position. The microprocessor 14 executes a servo algorithm (e.g., a servo compensator) for generating a position error control signal (PECS) 16 used to generate a VCM control signal 18 for controlling actuation of the VCM 12. A notch filter 20 filters the PECS 16 to attenuate certain frequencies that would otherwise excite resonances in the VCM 12 and actuator arm 10 assembly.

The analog circuitry for generating the VCM control signal 18 is typically integrated into a power driver chip 22 separate from a system-on-a-chip (SOC) comprising the microprocessor 14 and notch filter 20. In order to reduce the pin count and associated cost of the power driver chip 22, a serial communication circuit 24 is use for communication between the SOC and the power driver chip 22. An arbitration algorithm is implemented to arbitrate between the periodic output 26 of the notch filter 20 and other serial communications between the microprocessor 14 and power driver chip 22. Because the performance of the notch filter 20 degrades if jitter is induced in the periodic interval 25 for transmitting the output 26 to the power driver 22, the microprocessor 14 implements a hold-off of the serial communication circuit 24 to prevent other transmissions from interfering with the notch filter 20 transmission.

FIG. 2 illustrates the steps of a prior art arbitration algorithm which may be implemented in hardware (e.g., as part of the serial communication circuit 24) or implemented in firmware executed by the microprocessor 14. When a servo sector $6_i$ is encountered at step 28, at step 30 the embedded servo information is demodulated and a PECS computed by the microprocessor 14. At step 32 the microprocessor 14 inputs the PECS into the notch filter 20, and at step 34 a hold-off of other serial transmissions is initiated while the notch filter 20 computes the next output 26. When the hold-off interval expires at step 36, the output 26 of the notch filter 20 is transmitted immediately to the power driver 22 at step 38, and at step 40 other serial transmissions are enabled. Since the hold-off interval is typically longer than the computation time of the notch filter 20, the transmission of the notch filter's output 26 is delayed until the end of the hold-off interval. However, this delay does not significantly degrade operation of the notch filter 20 since it does not change (jitter) the periodic interval 25 for transmitting the notch filter's 20 output 26.

Other control components of the disk drive may require a substantially constant transmission interval to operate optimally. For example, the power driver 22 may comprise an analog-to-digital (A/D) converter for sampling various feedback signals, such as the current in the VCM coil 12, which may need to be transmitted to the microprocessor 14 at a substantially constant periodic interval in order to improve the performance of the VCM control algorithm. The disk drive may also comprises a vibration sensor for sensing external disturbances by generating a voltage proportional to vibration acceleration. The output of the vibration sensor is sampled by the analog-to-digital (A/D) converter within the power driver 22 to generate a sampled signal that is transmitted at a substantially constant periodic interval to the microprocessor 14 which generates a feed-forward correction signal applied to the VCM 12. Therefore it may be desirable to implement collision avoidance for other periodic control signals transmitted between the power driver 22 and microprocessor 14.

Various drawbacks have been identified by implementing a simple hold-off of other serial transmissions to prevent collisions with a control component that requires a constant periodic transmission, such as the notch filter 20 transmission or an A/D transmission. For example, A/D transmissions typically take much longer than other transmissions to complete. A hold-off scheme requires that the hold-off time be at least as long as the longest expected transmission period. However, using a hold-off equal to the maximum transmission time of the slowest transmission greatly reduces the bandwidth of the serial interface since it is not necessary to hold-off all other transmissions by that same time interval. In other words, shorter serial transmissions may be completed within the hold-off interval if allowed. The problem of reduced bandwidth is exacerbated as the number of serial transmissions between the SOC and power driver chip 22 increases, such as in disk drives employing a secondary notch filter for controlling a secondary actuator (e.g., a micro-actuator). In addition, the first and second notch filters may operate at different frequencies requiring further arbitration techniques to ensure that the outputs of both notch filters don't collide with one another or other serial transmissions. The collision avoidance algorithm must take into account the need to minimize jitter in the transmission interval of both notch filters, as well as accommodate other control components that may require a constant periodic transmission interval.

As the complexity and number of serial transmissions increases, the arbitration (collision avoidance) algorithm may be implemented in firmware executed by the microprocessor 14. However, since the control algorithm is typically executed during less than half of the sample period (wedge interval), firmware control can only send/receive data during less than half of the available time, reducing the bandwidth of the serial port even further. Additionally, the tight timing requirements for transmission control creates software that is quite difficult to debug and maintain, as the timing of the program must be carefully controlled. It is quite difficult to do this in a production environment when different branches of the code execute with varying timing. This problem is exacerbated as the amount of processing required by the microprocessor 14 increases, for example, as more sophisticated servo algorithms with multiple exception branches are employed, and particularly when changes are made to the firmware which may affect timing of the arbitration algorithm.

There is, therefore, a need to improve serial communications for a power driver chip in a disk drive by making more efficient use of serial communication bandwidth as well as processing bandwidth.

SUMMARY OF THE INVENTION

The present invention may be regarded as a disk drive comprising a disk including a plurality of tracks and a plurality of servo sectors, an actuator arm, a head coupled to a distal end of the actuator arm, and a voice coil motor (VCM) actuator for rotating the actuator arm about a pivot to actuate the head radial over the disk. The disk drive further comprises a microprocessor and a power driver for generating at least one actuator signal applied to the VCM actuator, wherein a serial communication circuit is used to communicate with the power driver. At least one control component periodically generates a control signal, wherein the control signal is transmitted at a substantially constant periodic interval using the serial communication circuit, and a timer times the periodic interval. A job queue controller arbitrates serial communication requests to access the power driver using the serial communication circuit. The serial communication requests include a request to transmit the control signal and requests generated by the microprocessor. The job queue controller services a communication request generated by the microprocessor if the communication request can be serviced before the timer expires.

In one embodiment, the power driver is implemented in a first integrated circuit, and the microprocessor and job queue controller are implemented in a second integrated circuit.

In another embodiment, the microprocessor generates serial communication requests to transmit data to and receives data from the power driver through the serial communication circuit.

In yet another embodiment, the power driver comprises an analog-to-digital (A/ID) converter, the at least one control component comprises the A/D converter for periodically sampling an analog signal to generate the control signal, and the control signal is transmitted from the power driver to the microprocessor at the substantially constant periodic interval.

In still another embodiment, the microprocessor generates a first position error control signal (PECS) in response to the servo sectors, the at least one control component comprises a first notch filter for filtering the first PECS to periodically generate a first filtered PECS, the control signal comprises the first filtered PECS transmitted to the power driver, the timer comprises a first notch timer for timing the substantially constant periodic interval for transmitting the first filtered PECS to the power driver, and the power driver generates the at least one actuator signal in response to the first filtered PECS. In one embodiment, the microprocessor generates the serial communication request to transmit the filtered PECS to the power driver. In another embodiment, the notch filter generates the serial communication request to transmit the filtered PECS to the power driver. In yet another embodiment, the first notch filter generates a plurality of first filtered PECS for each PECS generated by the microprocessor, and the first notch timer is automatically periodically reloaded as it transmits the first filtered PECS to the power driver at periodic intervals.

In yet another embodiment, the disk drive further comprises a secondary actuator for actuating the head, a second notch filter, and a second notch timer. The power driver for generating a second actuator signal applied to the secondary actuator, the microprocessor for generating a second position error control signal (PECS) in response to the servo sectors, the at least one control component comprises the second notch filter for filtering the second PECS to periodically generate a second filtered PECS, the second filtered PECS transmitted to the power driver at a substantially constant periodic interval, the second notch timer for timing the substantially constant periodic interval for transmitting the second filtered PECS to the power driver, the power driver generates the second actuator signal in response to the second filtered PECS, and the job queue controller services a communication request generated by the microprocessor if the communication request can be serviced before the first and second notch timer expire. In one embodiment, the first notch filter generates N first filtered PECS for each PECS generated the by microprocessor, the second notch filter generates M second filtered PECS for each PECS generated the by microprocessor, the first notch timer is reloaded after transmitting the first filtered PECS to the power driver, the second notch timer is reloaded after transmitting the second filtered PECS to the power driver, and the job queue controller executes a collision avoidance algorithm by preventing the first and second notch timers from expiring simultaneously thereby requesting simultaneous transmissions. In another embodiment, the job queue controller adjusts at least one of the first and second notch timers in response to the values selected for N and M. In yet another embodiment, when the second notch filter generates one of the second filtered PECS, the job queue controller adjusts the second notch timer in response to the current value of first notch timer, and the values selected for N and M. In still another embodiment, the job queue controller delays starting the second timer by at least one cycle.

In another embodiment, the job queue controller compares a calibrated transmission time of a serial communication request to the timer to determine whether the serial communication request can be serviced before the timer expires. In one embodiment, the microprocessor generates a calibration serial communication request to compute the calibrated transmission time.

The present invention may also be regarded as a method of operating a disk drive, the disk drive comprising a disk comprising a plurality of tracks and a plurality of servo sectors, an actuator arm, a head coupled to a distal end of the actuator arm, a voice coil motor (VCM) actuator for rotating the actuator arm about a pivot to actuate the head radial over the disk, a power driver for generating at least one actuator signal applied to the VCM actuator, a serial communication circuit for communicating with the power driver, a microprocessor, at least one control component, and a job queue controller for arbitrating serial communication requests to access the power driver using the serial communication circuit. The control component periodically generates a control signal which is transmitted using the serial communication circuit at a substantially constant periodic interval, wherein a timer times the periodic interval. The microprocessor generates a serial communication request, and the job queue controller services the communication request generated by the microprocessor if the communication request can be serviced before the timer expires.

The present invention may also be regarded as disk drive circuitry for use in a disk drive comprising a disk including a plurality of tracks and a plurality of servo sectors, an actuator arm, a head coupled to a distal end of the actuator arm, and a voice coil motor (VCM) actuator for rotating the actuator arm about a pivot to actuate the head radial over the disk. The disk drive further comprises a power driver for generating at least one actuator signal applied to the VCM actuator. The disk drive circuitry comprises a microprocessor and a serial communication circuit for communicating with the power driver, wherein the serial communication circuit for transmitting a control signal periodically generated by at least one control component, and the disk drive circuitry comprises a timer for timing the periodic interval. The disk drive circuitry further comprises a job queue controller for arbitrating serial communication requests to access the power driver using the serial communication circuit. The serial communication requests include a request to transmit the control signal and requests generated by the microprocessor. The job queue controller services a communication request generated by the microprocessor if the communication request can be serviced before the timer expires.

BRIEF DESCRIPTION OF THE DRAWINGS

FIG. 3 shows a disk drive according to an embodiment of the present invention comprising a job queue controller for implementing an arbitration algorithm and a notch filter timer for timing a transmission interval for transmitting the filtered PECS.

FIG. 4A is a flow diagram illustrating operation of a microprocessor which generates serial communication requests as well as the PECS at each servo sector which is input into the notch filter.

FIG. 4B is a flow diagram illustrating operation of the job queue controller which prevents collisions between the output of notch filter (filtered PECS) and other serial communication requests generated by the microprocessor by allowing other transmissions if they can be serviced before the notch filter timer expires.

DESCRIPTION OF THE PREFERRED EMBODIMENTS

Figure 2:
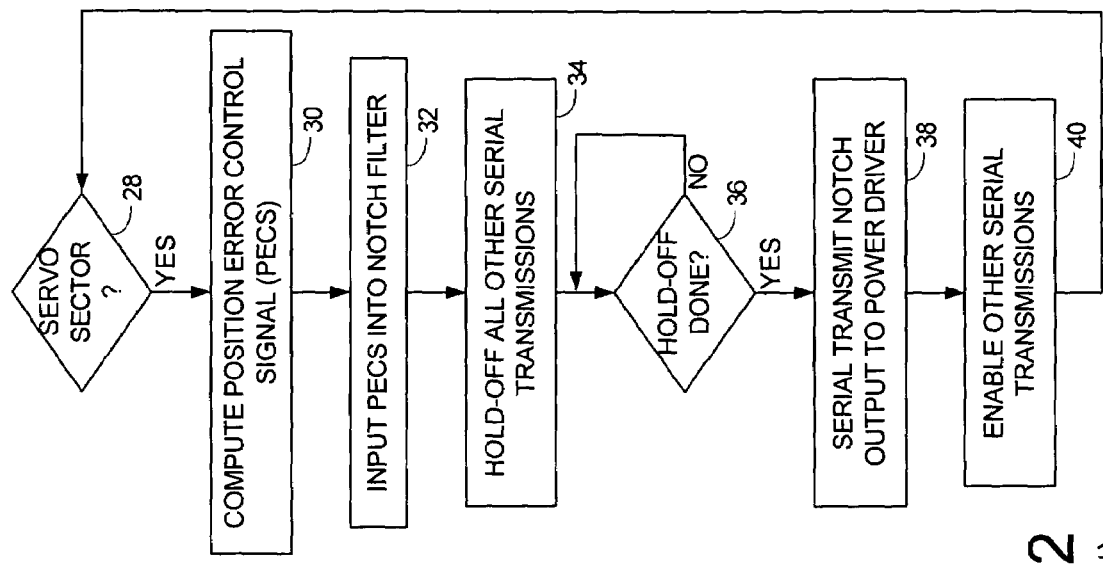
FIG. 2 is a flow diagram illustrating a prior art hold-off arbitration algorithm which avoids collisions while transmitting the filtered PECS to the power driver.
Figure 1:
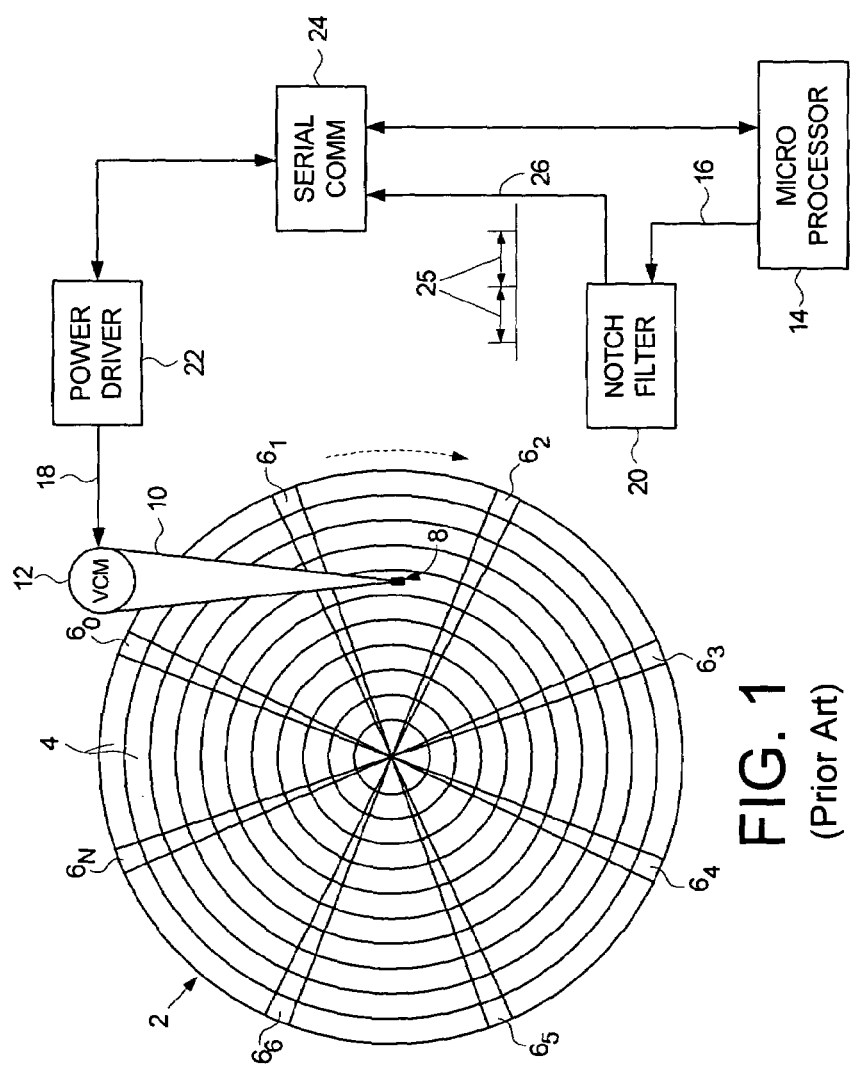
FIG. 1 shows a prior art disk drive comprising a power driver for applying a control signal to a voice coil motor, a serial communication circuit for communicating with the power driver, and a notch filter for generating a filtered position error control signal (PECS), wherein the filtered PECS is transmitted to the power driver using the serial communication circuit.

FIG. 3 shows a disk drive according to an embodiment of the present invention comprising a disk 2 including a plurality of tracks 4 and a plurality of servo sectors $6_0$–$6_N$, an actuator arm 10, a head 8 coupled to a distal end of the actuator arm 10, and a voice coil motor (VCM) actuator 12 for rotating the actuator arm 10 about a pivot to actuate the head 8 radial over the disk 2. The disk drive further comprises microprocessor 42, and a power driver 44 for generating at least one actuator signal applied to the VCM actuator 12, wherein a serial communication circuit 46 is used to communicate with the power driver 44. At least one control component (e.g., a notch filter 48) periodically generates a control signal 50, wherein the control signal 50 is transmitted at a substantially constant periodic interval using the serial communication circuit 46, and a timer (e.g., a notch timer 52) times the periodic interval. A job queue controller 54 arbitrates serial communication requests to access the power driver 44 using the serial communication circuit 46. The serial communication requests include a request to transmit the control signal 50 and requests 51 generated by the microprocessor 42. The job queue controller 54 services a communication request generated by the microprocessor 42 if the communication request can be serviced before the timer (e.g., the notch timer 52) expires.

Any suitable control component may periodically generate the control signal that is transmitted at a substantially constant periodic interval using the serial communication circuit 46. In addition, the control signal may be transmitted to the power driver 44, or it may be transmitted from the power driver 44. For example, in one embodiment the current 56 flowing through the VCM coil 12 is sampled by an A/D converter 58 within the power driver 44, wherein the signal samples are transmitted to the microprocessor 42 at a substantially constant periodic interval in order to improve the performance of the VCM control algorithm. In yet another embodiment, the disk drive comprises a vibration sensor for sensing external disturbances by generating a voltage proportional to vibration acceleration. The output of the vibration sensor is sampled by the A/D converter 58 to generate a sampled signal that is transmitted at a substantially constant periodic interval to the microprocessor 42 which generates a feed-forward correction signal applied to the VCM 12.

In the embodiment of FIG. 3, the serial communication requests are queued in a data queue 60. In one embodiment, each serial communication request queued in the data queue 60 comprises a field that indicates the transmission time required to service the request, measured in cycles of the notch timer 52. The job queue controller 54 evaluates the transmission time for each serial communication request to determine whether it can be serviced before the notch timer 52 expires. Since the serial communication requests can be serviced in a random order out of the data queue 60, in one embodiment each serial communication request includes a field that identifies the target address for the transmission. For example, the serial communication request for transmitting the filtered PECS control signal 50 comprises a target address identifying it to the power driver 44 for generating the actuator signal applied to the VCM actuator 12.

FIG. 4A is a flow diagram executed by the microprocessor 42 for generating a position error control signal (PECS) 62 in response to the servo sectors $6_0$–$6_N$. When at step 64 a servo sector 6 is encountered, at step 66 the microprocessor 42 computes the PECS 62 based on the detected location of the head 8 with respect to the centerline of the target track. At step 68 the PECS 62 is input into the notch filter 48, and at step 70 the microprocessor 42 generates other serial communication requests 51 input into the data queue 60. FIG. 4B is a flow diagram illustrating operation of the job queue controller 54 which operates independent of the microprocessor 42. At step 72 the job queue controller 54 prioritizes the serial communication requests stored in the data queue 60, and at step 74 determines which serial communication requests can be serviced before the notch timer 52 expires. At step 76 the job queue controller 54 services the serial communication requests that can be transmitted without causing a collision, as well as transmitting the filtered PECS 50 when the notch timer 52 expires.

Figure 5:
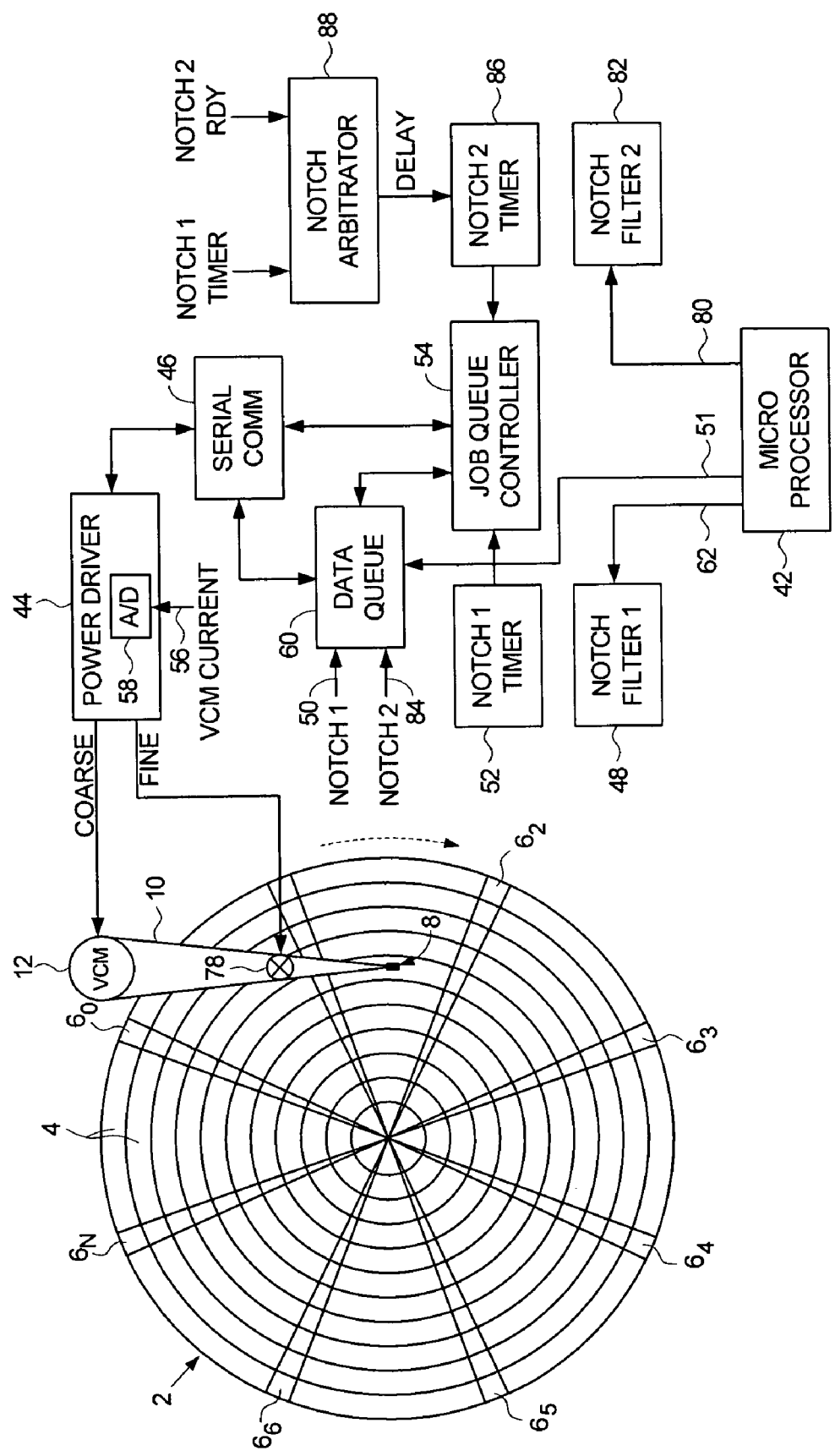
FIG. 5 shows a disk drive according to an embodiment of the present invention comprising a first notch filter and a second notch filter which operate at different frequencies, and a first notch timer and a second notch timer for timing the transmissions of the respective notch filters.

FIG. 5 shows an embodiment of the present invention wherein the disk drive further comprises a secondary actuator 78 for actuating the head 8. Any suitable secondary actuator may be employed, such as a microactuator comprising a piezoelectric element for actuating the head 8 in fine movements. The power driver 44 generates a VCM actuator control signal applied to the VCM actuator 12 for controlling coarse movement of the head 8, and a secondary actuator control signal applied to the secondary actuator 78 for controlling fine movement of the head 8. The microprocessor 42 generates a secondary PECS 80, and a second notch filter 82 filters the PECS 80 to generate a filtered PECS 84 for controlling the secondary actuator 78. The filtered PECS 84 is transmitted to the power driver 44 through the same serial communication circuit 46 used for the first actuator at a substantially constant periodic interval timed by a second notch timer 86. A notch arbitrator 88 prevents collisions between the transmission of the notch filter outputs 50 and 84, and in one embodiment, prevents collisions by delaying the second notch timer 86 by one cycle.

Figure 6A:
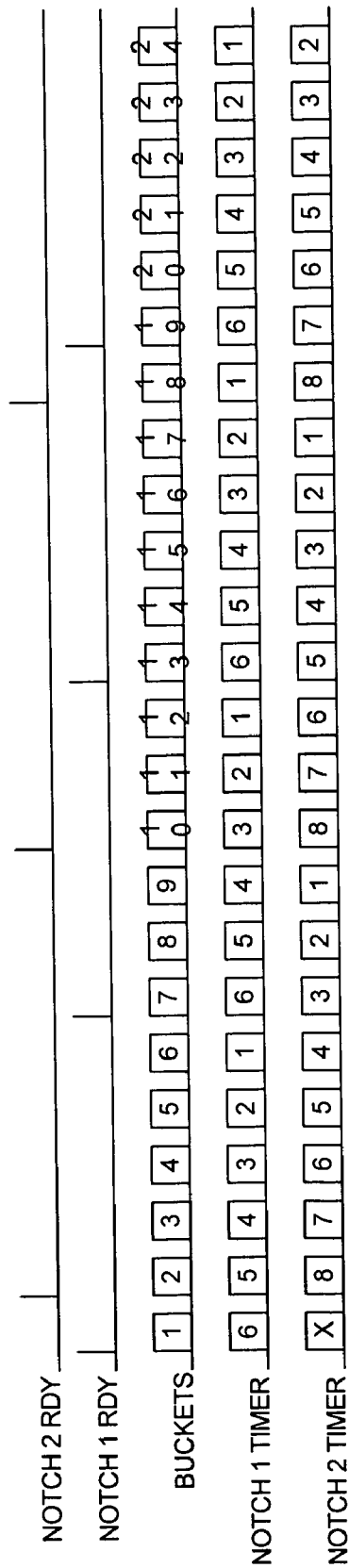
FIGS. 6A–6B illustrate how a collision can occur while transmitting the output of the two notch filters.

In one embodiment, the first and second notch filters 48 and 82 operate at different frequencies such that each notch filter outputs a different number of filtered PECS for each PECS generated by the microprocessor (i.e., for each servo sector 6). In order for the notch filters to operate optimally, it is important that the notch filter outputs be transmitted to the power driver 44 at a substantially constant periodic interval which means avoiding collisions between the notch filter outputs. FIG. 6A illustrates this embodiment wherein the first notch filter 48 generates four (4×) filtered PECS 50 for each primary PECS 62 generated by the microprocessor 42 and the second notch filter 82 generates three (3×) filtered PECS 84 for each secondary PECS 80 generated by the microprocessor 42. The transmission time between servo sectors is divided into a number of buckets (24 in the example of FIG. 6A), wherein each bucket represents a predetermined number of bits transmitted by the serial communication circuit 46. In this embodiment, a bucket comprises enough bits to transmit the filtered PECS 50 and 84 generated by the notch filters. Also in this embodiment, the notch timers 52 and 86 cycle at a period equal to a bucket period and are loaded with a count equal to the number of buckets between servo sectors (24 in this example) divided by the number of outputs per servo sector. In the example shown in FIG. 6A, the first notch timer 52 is loaded with a count of 6 (24/4) and the second notch timer is loaded with a count of 8 (24/3).

Figure 6B:
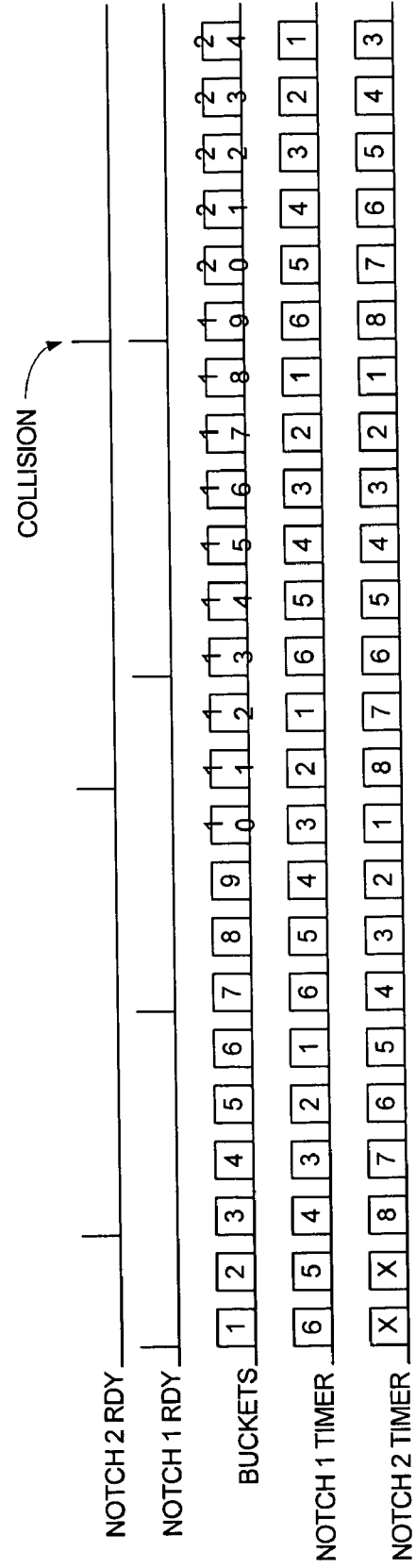

When the first notch filter 48 is ready to transmit the filtered PECS 50 to the power driver 44, the first notch timer 52 is reloaded with a count of 6 and is decremented with each bucket as shown in FIG. 6A. When the second notch filter 82 is ready to transmit the filtered PECS 84 to the power driver 44, the notch arbitrator 88 (FIG. 5) evaluates the state of the first notch timer 52 to determine whether a collision will occur at any time during the entire transmission sequence if the filtered PECS 84 is transmitted immediately. In the example of FIG. 6A, if the second notch filter 82 is ready when the first notch timer 52 has a value of 5, a collision will not occur if the filtered PECS 84 is transmitted immediately. In the example of FIG. 6B, if the second notch filter 82 is ready when the first notch timer 52 has a value of 4, a collision will occur at the fourth transmission from the first notch (and the third from the second notch) if the filtered PECS 84 is transmitted immediately. To avoid the collision, in one embodiment the notch arbitrator 88 delays the transmission of the filtered PECS 84 by one bucket, and also delays the start of the second notch timer 86 by one cycle (one bucket). This is illustrated in FIG. 6C wherein the collision shown in FIG. 6B is avoided by delaying the second notch timer 86 by one cycle if the first notch timer 52 has a count of 4 when the second notch filter 82 is ready to transmit.

Figures 6C, 7:
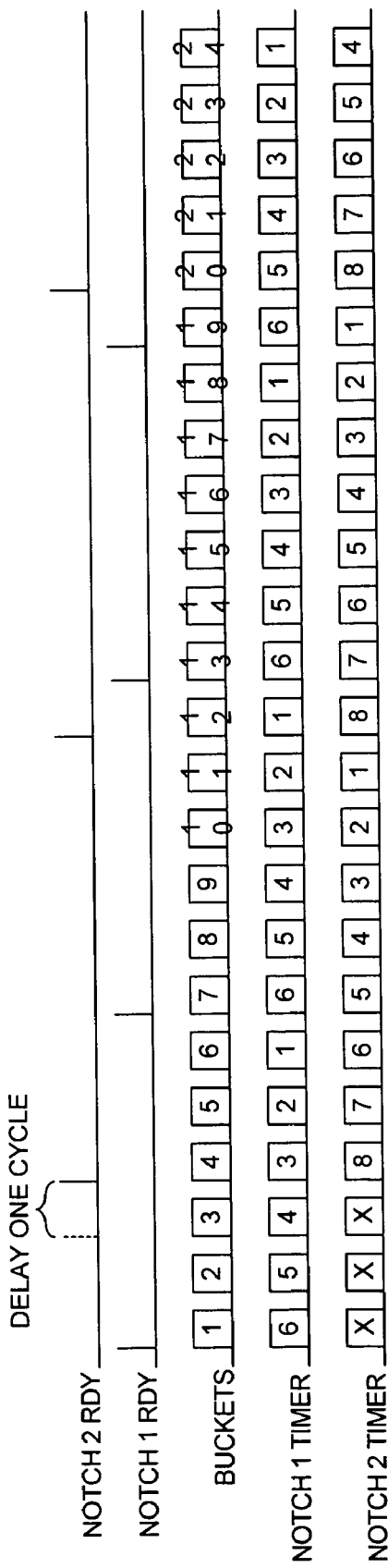
FIG. 6C illustrates how the collision of FIG. 6B can be avoided according to an embodiment of the present invention by delaying the second notch timer one cycle.
FIG. 7 is a table according to an embodiment of the present invention which identifies when delaying the second notch timer is necessary to avoid a collision relative to the value of the first notch timer when the second notch filter is ready to transmit.

FIG. 7 is a table showing the values of the first notch timer 52 that require the second notch timer 86 to be delayed by one cycle in order to avoid a collision between the outputs of the first and second notch filters. Each entry in the table shows the counter values of the first notch timer 52 for the respective over-sample rates of the first and second notch filters. In the example of FIGS. 6A–6C wherein the first notch filter 48 operates at 4× and the second notch filter 82 operates at 3×, the second notch timer 86 is delayed by one cycle if the first notch timer 52 has a count value in the set {0, 2, 4, 6} when the second notch filter 82 is ready to transmit. A similar table may be generated for any suitable number of buckets between servo sectors. In order to maintain a substantially constant periodic interval between each notch filter output, the number of buckets is preferably selected to be integer divisible by the over-sample rates of the notch filters.

In alternative embodiments, other components may generate a control signal at a substantially periodic interval. For example, the disk drive may employ a single notch filter for generating a periodic control signal that controls the VCM actuator 12, and a periodic control signal for controlling the spindle motor. In yet another embodiment, the disk drive may generate three or more periodic control signals, such as employing two notch filters as in the embodiment of FIG. 5 together with a periodic control signal for controlling the spindle motor that rotates the disk. The technique disclosed above for avoiding collisions can easily be extended to any of these alternative embodiments.

The job queue controller 54 in the embodiment of FIG. 5 evaluates the first and second notch timers 52 and 86 to determine whether any pending serial communication requests generated by the microprocessor 42 and queued in the data queue 60 can be serviced before both timers expire. This ensures that the transmission of other serial communication requests will not collide with the periodic control signals, such as the output of the notch filters. In one embodiment, the microprocessor 42 generates a calibration serial communication request to compute the calibrated transmission time (number of buckets) for each request. For example, the microprocessor may send a "dummy" serial communication request to read the VCM current signal 56 from the power driver 44 while monitoring the number of buckets required to complete the read. In operation, the job queue controller 54 compares this calibrated transmission time of a serial communication request to the value in the notch timer to determine whether the serial communication request can be serviced before the notch timer expires. As described above, in one embodiment each serial communication requests queued in the data queue 60 comprises a field for storing the calibrated transmission time. In an alternative embodiment, the serial communication requests comprise a "type" identifier, wherein a calibrated transmission time is associated with each type of serial communication request. In yet another embodiment, transmission time is inferred from the address that the processor uses to write the data to the data queue 60.

The invention claimed is:

1. A disk drive comprising:
  (a) a disk comprising a plurality of tracks and a plurality of servo sectors;
  (b) an actuator arm;
  (c) a head coupled to a distal end of the actuator arm;
  (d) a voice coil motor (VCM) actuator for rotating the actuator arm about a pivot to actuate the head radially over the disk;
  (e) a power driver for generating at least one actuator signal applied to the VCM actuator;
  (f) a serial communication circuit for communicating with the power driver;
  (g) a microprocessor;
  (h) at least one control component for periodically generating a control signal, wherein the control signal is transmitted at a substantially constant periodic interval using the serial communication circuit;
  (i) a timer for timing the periodic interval; and
  (j) a job queue controller for arbitrating serial communication requests to access the power driver using the serial communication circuit, wherein:
    the serial communication requests include a request to transmit the control signal;
    the serial communication requests include serial communication requests generated by the microprocessor; and
    the job queue controller services a communication request generated by the microprocessor if the communication request can be serviced before the timer expires.

2. The disk drive as recited in claim 1, wherein the power driver is implemented in a first integrated circuit, and the microprocessor and job queue controller are implemented in a second integrated circuit.

3. The disk drive as recited in claim 1, wherein the microprocessor generates serial communication requests to transmit data to and receives data from the power driver through the serial communication circuit.

4. The disk drive as recited in claim 1, wherein:
  (a) the power driver comprises an analog-to-digital (A/D) converter;
  (b) the at least one control component comprises the A/D converter for periodically sampling an analog signal to generate the control signal; and
  (c) the control signal is transmitted from the power driver to the microprocessor at the substantially constant periodic interval.

5. The disk drive as recited in claim 1, wherein:
  (a) the microprocessor generates a first position error control signal (PECS) in response to the servo sectors;
  (b) the at least one control component comprises a first notch filter for filtering the first PECS to periodically generate a first filtered PECS;
  (c) the control signal comprises the first filtered PECS transmitted to the power driver;
  (d) the timer comprises a first notch timer for timing the substantially constant periodic interval for transmitting the first filtered PECS to the power driver; and
  (e) the power driver generates the at least one actuator signal in response to the first filtered PECS.

6. The disk drive as recited in claim 5, wherein the microprocessor generates the serial communication request to transmit the filtered PECS to the power driver.

7. The disk drive as recited in claim 5, wherein the notch filter generates the serial communication request to transmit the filtered PECS to the power driver.

8. The disk drive as recited in claim 5, wherein:
  (a) the first notch filter generates a plurality of first filtered PECS for each PECS generated by the microprocessor; and
  (b) the first notch timer is reloaded after transmitting the first filtered PECS to the power driver.

9. The disk drive as recited in claim 5, further comprising a secondary actuator for actuating the head, a second notch filter, and a second notch timer, wherein:
  (a) the power driver for generating a second actuator signal applied to the secondary actuator;
  (b) the microprocessor for generating a second position error control signal (PECS) in response to the servo sectors;
  (c) the at least one control component comprises the second notch filter for filtering the second PECS to periodically generate a second filtered PECS;
  (d) the second filtered PECS transmitted to the power driver at a substantially constant periodic interval;
  (e) the second notch timer for timing the substantially constant periodic interval for transmitting the second filtered PECS to the power driver;
  (f) the power driver generates the second actuator signal in response to the second filtered PECS; and
  (g) the job queue controller services a communication request generated by the microprocessor if the communication request can be serviced before the second notch timer expires.

10. The disk drive as recited in claim 9, wherein:
  (a) the first notch filter generates N first filtered PECS for each PECS generated the by microprocessor;
  (b) the second notch filter generates M second filtered PECS for each PECS generated the by microprocessor;
  (c) the first notch timer is reloaded after transmitting the first filtered PECS to the power driver;
  (d) the second notch timer is reloaded after transmitting the second filtered PECS to the power driver; and
  (e) the job queue controller executes a collision avoidance algorithm by preventing the first and second notch timers from expiring simultaneously.

11. The disk drive as recited in claim 10, wherein the job queue controller adjusts at least one of the first and second notch timers in response to the values selected for N and M.

12. The disk drive as recited in claim 11, wherein when the second notch filter generates one of the second filtered PECS, the job queue controller adjusts the second notch timer in response to the current value of first notch timer, and the values selected for N and M.

13. The disk drive as recited in claim 12, wherein the job queue controller delays starting the second timer by at least one cycle.

14. The disk drive as recited in claim 1, wherein the job queue controller compares a calibrated transmission time of a serial communication request to the timer to determine whether the serial communication request can be serviced before the timer expires.

15. The disk drive as recited in claim 14, wherein the microprocessor generates a calibration serial communication request to compute the calibrated transmission time.

16. A method of operating a disk drive, the disk drive comprising a disk comprising a plurality of tracks and a plurality of servo sectors, an actuator arm, a head coupled to a distal end of the actuator arm, a voice coil motor (VCM) actuator for rotating the actuator arm about a pivot to actuate the head radial over the disk, a power driver for generating at least one actuator signal applied to the VCM actuator, a serial communication circuit for communicating with the power driver, a microprocessor, at least one control component, and a job queue controller for arbitrating serial communication requests to access the power driver using the serial communication circuit, the method comprising the steps of:

(a) the control component periodically generating a control signal;
(b) transmitting the control signal at a substantially constant periodic interval using the serial communication circuit;
(c) using a timer for timing the periodic interval;
(d) the microprocessor generating a serial communication request; and
(e) the job queue controller servicing the communication request generated by the microprocessor if the communication request can be serviced before the timer expires.

17. The method as recited in claim 16, wherein the power driver is implemented in a first integrated circuit, and the microprocessor and job queue controller are implemented in a second integrated circuit.

18. The method as recited in claim 16, wherein the microprocessor generates serial communication requests to transmit data to and receives data from the power driver through the serial communication circuit.

19. The method as recited in claim 16, wherein:
(a) the power driver comprises an analog-to-digital (A/D) converter;
(b) the at least one control component comprises the A/D converter for periodically sampling an analog signal to generate the control signal; and
(c) the control signal is transmitted from the power driver to the microprocessor at the substantially constant periodic interval.

20. The method as recited in claim 16, wherein:
(a) the microprocessor generates a first position error control signal (PECS) in response to the servo sectors;
(b) the at least one control component comprises a first notch filter for filtering the first PECS to periodically generate a first filtered PECS;
(c) the control signal comprises the first filtered PECS transmitted to the power driver;
(d) the timer comprises a first notch timer for timing the substantially constant periodic interval for transmitting the first filtered PECS to the power driver; and
(e) the power driver generates the at least one actuator signal in response to the first filtered PECS.

21. The method as recited in claim 20, wherein the microprocessor generates the serial communication request to transmit the filtered PECS to the power driver.

22. The method as recited in claim 20, wherein the notch filter generates the serial communication request to transmit the filtered PECS to the power driver.

23. The method as recited in claim 20, wherein:
(a) the first notch filter generates a plurality of first filtered PECS for each PECS generated the by microprocessor; and
(b) the first notch timer is reloaded after transmitting the first filtered PECS to the power driver.

24. The method as recited in claim 20, further comprising a secondary actuator for actuating the head, a second notch filter, and a second notch timer, wherein:
(a) the power driver for generating a second actuator signal applied to the secondary actuator;
(b) the microprocessor for generating a second position error control signal (PECS) in response to the servo sectors;
(c) the at least one control component comprises the second notch filter for filtering the second PECS to periodically generate a second filtered PECS;
(d) the second filtered PECS transmitted to the power driver at a substantially constant periodic interval;
(e) the second notch timer for timing the substantially constant periodic interval for transmitting the second filtered PECS to the power driver;
(f) the power driver generates the second actuator signal in response to the second filtered PECS; and
(g) the job queue controller services a communication request generated by the microprocessor if the communication request can be serviced before the second notch timer expires.

25. The method as recited in claim 24, wherein:
(a) the first notch filter generates N first filtered PECS for each PECS generated the by microprocessor;
(b) the second notch filter generates M second filtered PECS for each PECS generated the by microprocessor;
(c) the first notch timer is reloaded after transmitting the first filtered PECS to the power driver;
(d) the second notch timer is reloaded after transmitting the second filtered PECS to the power driver; and
(e) the job queue controller executes a collision avoidance algorithm by preventing the first and second notch timers from expiring simultaneously.

26. The method as recited in claim 25, wherein the job queue controller adjusts at least one of the first and second notch timers in response to the values selected for N and M.

27. The method as recited in claim 26, wherein when the second notch filter generates one of the second filtered PECS, the job queue controller adjusts the second notch timer in response to the current value of first notch timer, and the values selected for N and M.

28. The method as recited in claim 27, wherein the job queue controller delays starting the second timer by at least one cycle.

29. The method as recited in claim 16, wherein the job queue controller compares a calibrated transmission time of a serial communication request to the timer to determine whether the serial communication request can be serviced before the timer expires.

30. The method as recited in claim 29, wherein the microprocessor generates a calibration serial communication request to compute the calibrated transmission time.

31. Disk drive circuitry for use in a disk drive comprising a disk including a plurality of tracks and a plurality of servo sectors, an actuator arm, a head coupled to a distal end of the actuator arm, a voice coil motor (VCM) actuator for rotating the actuator arm about a pivot to actuate the head radially over the disk, and a power driver for generating at least one actuator signal applied to the VCM actuator, the disk drive circuitry comprising:
(a) a serial communication circuit for communicating with the power driver, wherein the serial communication circuit for transmitting a control signal periodically generated by at least one control component at a substantially constant periodic interval;
(b) a microprocessor;

(c) a timer for timing the periodic interval; and
(d) a job queue controller for arbitrating serial communication requests to access the power driver using the serial communication circuit, wherein:
the serial communication requests include a request to transmit the control signal;
the serial communication requests include serial communication requests generated by the microprocessor; and
the job queue controller services a communication request generated by the microprocessor if the communication request can be serviced before the timer expires.

32. The disk drive circuitry as recited in claim 31, wherein the power driver is implemented in a first integrated circuit, and the microprocessor and job queue controller are implemented in a second integrated circuit.

33. The disk drive circuitry as recited in claim 31, wherein the microprocessor generates serial communication requests to transmit data to and receives data from the power driver through the serial communication circuit.

34. The disk drive circuitry as recited in claim 31, wherein:
(a) the power driver comprises an analog-to-digital (A/D) converter;
(b) the at least one control component comprises the A/D converter for periodically sampling an analog signal to generate the control signal; and
(c) the control signal is transmitted from the power driver to the microprocessor at the substantially constant periodic interval.

35. The disk drive circuitry as recited in claim 31, further comprising a first notch filter, wherein:
(a) the microprocessor generates a first position error control signal (PECS) in response to the servo sectors;
(b) the at least one control component comprises the first notch filter for filtering the first PECS to periodically generate a first filtered PECS;
(c) the control signal comprises the first filtered PECS transmitted to the power driver;
(d) the timer comprises a first notch timer for timing the substantially constant periodic interval for transmitting the first filtered PECS to the power driver; and
(e) the power driver generates the at least one actuator signal in response to the first filtered PECS.

36. The disk drive circuitry as recited in claim 35, wherein the microprocessor generates the serial communication request to transmit the filtered PECS to the power driver.

37. The disk drive circuitry as recited in claim 35, wherein the notch filter generates the serial communication request to transmit the filtered PECS to the power driver.

38. The disk drive circuitry as recited in claim 35, wherein:
(a) the first notch filter generates a plurality of first filtered PECS for each PECS generated by the microprocessor; and
(b) the first notch timer is reloaded after transmitting the first filtered PECS to the power driver.

39. The disk drive circuitry as recited in claim 35, wherein the disk drive further comprises a secondary actuator for actuating the head, the disk drive circuitry further comprising a second notch filter, and a second notch timer, wherein:
(a) the power driver for generating a second actuator signal applied to the secondary actuator;
(b) the microprocessor for generating a second position error control signal (PECS) in response to the servo sectors;
(c) the at least one control component comprises the second notch filter for filtering the second PECS to periodically generate a second filtered PECS;
(d) the second filtered PECS transmitted to the power driver at a substantially constant periodic interval;
(e) the second notch timer for timing the substantially constant periodic interval for transmitting the second filtered PECS to the power driver;
(f) the power driver generates the second actuator signal in response to the second filtered PECS; and
(g) the job queue controller services a communication request generated by the microprocessor if the communication request can be serviced before the second notch timer expires.

40. The disk drive circuitry as recited in claim 39, wherein:
(a) the first notch filter generates N first filtered PECS for each PECS generated the by microprocessor;
(b) the second notch filter generates M second filtered PECS for each PECS generated the by microprocessor;
(c) the first notch timer is reloaded after transmitting the first filtered PECS to the power driver;
(d) the second notch timer is reloaded after transmitting the second filtered PECS to the power driver; and
(e) the job queue controller executes a collision avoidance algorithm by preventing the first and second notch timers from expiring simultaneously.

41. The disk drive circuitry as recited in claim 40, wherein the job queue controller adjusts at least one of the first and second notch timers in response to the values selected for N and M.

42. The disk drive circuitry as recited in claim 41, wherein when the second notch filter generates one of the second filtered PECS, the job queue controller adjusts the second notch timer in response to the current value of first notch timer, and the values selected for N and M.

43. The disk drive circuitry as recited in claim 42, wherein the job queue controller delays starting the second timer by at least one cycle.

44. The disk drive circuitry as recited in claim 31, wherein the job queue controller compares a calibrated transmission time of a serial communication request to the timer to determine whether the serial communication request can be serviced before the timer expires.

45. The disk drive circuitry as recited in claim 44, wherein the microprocessor generates a calibration serial communication request to compute the calibrated transmission time.

* * * * *